2 Sheets—Sheet 1.

E. R. PARSIL & C. H. VAN HOUTEN.
GRAVE FILLER.

No. 182,594. Patented Sept. 26, 1876.

Attest:
Horace Harris
Chas. P. Roth

Inventor:
Edwin R. Parsil
Charles H. Van Houten

2 Sheets—Sheet 2.

E. R. PARSIL & C. H. VAN HOUTEN.
GRAVE FILLER.

No. 182,594. Patented Sept. 26, 1876.

Witness
Horace Harris
Chas. P. Rost

Inventor
Edwin R. Parsil
Charles H. Van Houten

UNITED STATES PATENT OFFICE.

EDWIN R. PARSIL AND CHARLES H. VAN HOUTEN, OF NEWARK, N. J.

IMPROVEMENT IN GRAVE-FILLERS.

Specification forming part of Letters Patent No. 182,594, dated September 26, 1876; application filed July 20, 1876.

*To all whom it may concern:*

Be it known that we, EDWIN R. PARSIL and CHAS. H. VAN HOUTEN, of Newark, in the county of Essex and State of New Jersey, have invented a certain Improvement in Grave-Filling Machines, of which the following is a specification:

Our invention consists in the combined revolving receptacle and mechanism for receiving the earth thrown up in digging a grave, so that none of it will be thrown on the ground, and for returning the earth to fill up the grave when it is required.

Figure 1:
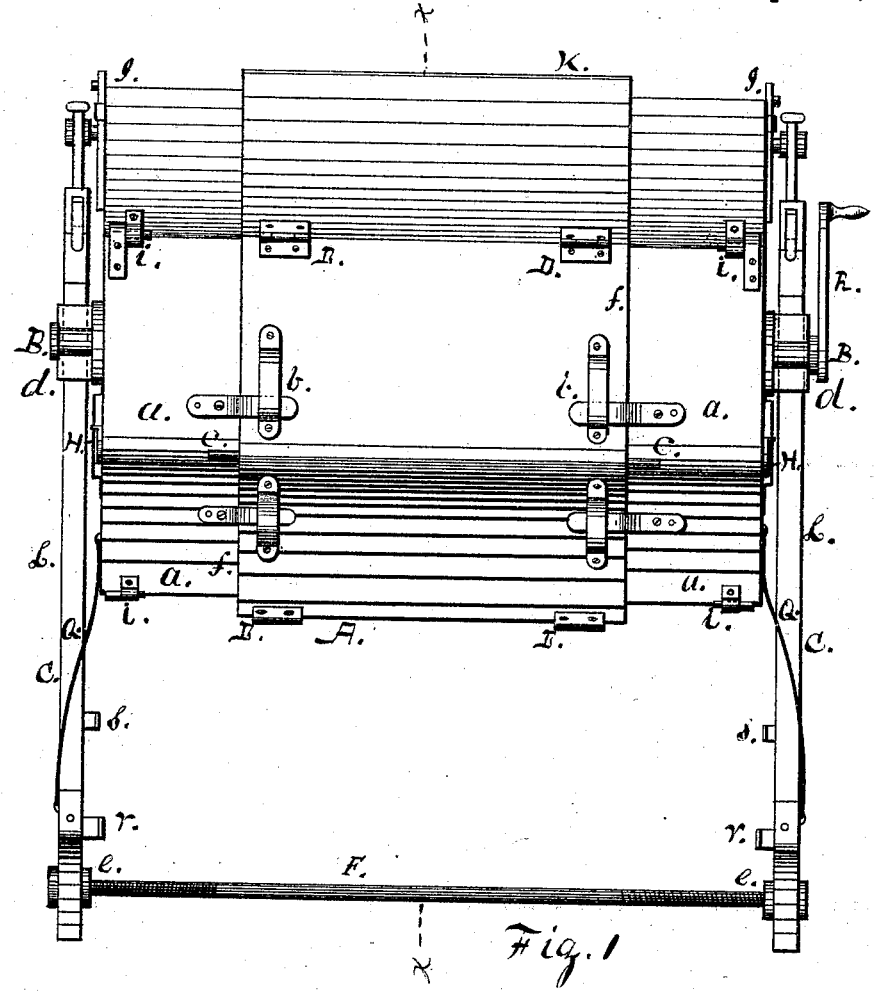
Figure 2:
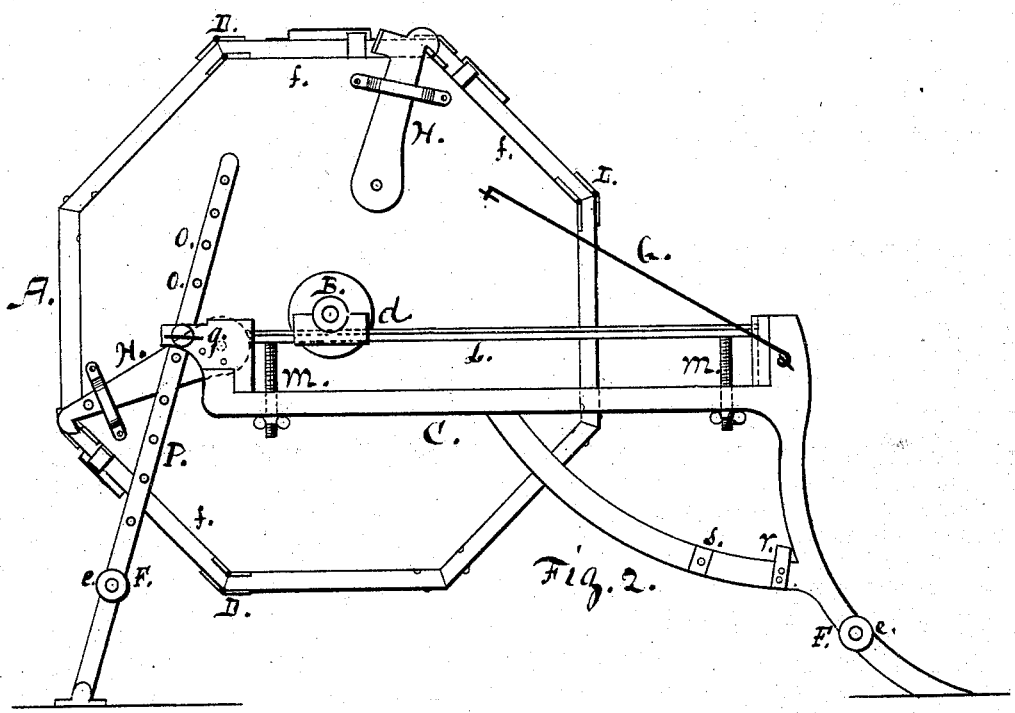
Figure 3:
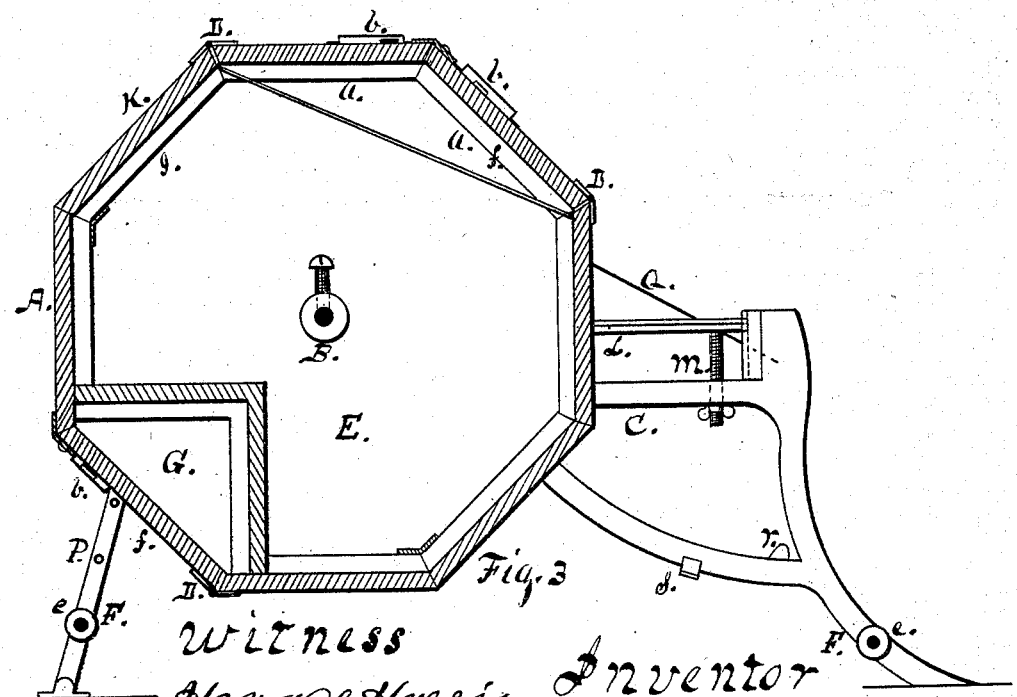

Figure 1 is a plan view of the machine. Fig. 2 is an end view. Fig. 3 is a cross-section on a line of *x x*.

The receptacle A for the earth is an octagonal revolving cylinder, or it may be round, or other shape, and is hung on an axle, B, the ends of which rest on a frame, C. This cylinder is provided with two receptacles, G and E. (Shown especially in Fig. 3.) Of these receptacles the one G is for receiving the surface earth, and the one E for receiving the earth below that; and they have each covers *f* with hinges D. The receptacle G has but one cover, and the receptacle E has two. The covers when closed are held by the hooks or catches H on each end. The cylinder, as shown, is made to telescope from each end by the ends I closing into the center K, for the purpose of working longer or shorter graves. The sections *a* of the sides, forming parts of the covers, by the hooks *i* are attached to the ends of the adjoining sections of the sides, and the inner ends of sections *a* are caught and held by the strip and bar *b*. To telescope or shorten the cylinder, take off these sections *a*, and then the ends I may be pressed in to close upon the ends of the center K, and the catches H will hook onto the pins *c*. When shortened up, the sides of the frame are also closed up against the ends of the cylinder by turning the nuts *e* on the screw-rods F.

The cylinders may be made without telescoping—just regular sides the whole length—and in that shape partitions may be put across the inside to provide for working shorter graves. And it is not essential to the working of my improvement that there shall be just two compartments for the earth, for there may be but one, or there may be more than two, and the same general results be obtained.

The journals of the axle B turn in sliding boxes *d* sliding on the adjustable bars L. The ends of these bars work up and down in ways in the frame C, and are raised or lowered by the screws *m*, so that they may be let down alike on one side; or one end of one side may be let down more than the rest, accommodating the machine to different positions on uneven ground, and over graves, or on a hillside. The posts P are on the back of the machine, and they also are made adjustable by passing through slots in the frame C, which allows them to stand at different angles, and by the holes O, through which the screws *g* pass, thus raising or lowering that part of the machine. When the machine is to be used, it is set so that the front will be over the grave to be dug, and the cylinder will be slid back on the bars L to the rear end of the bars, when it will be away from over the grave. The cylinder will stand so that the cover of compartment G will occupy the position of the covers of receptacle E, (see Fig. 3,) and will be held in position by the rod and hook Q. The cover of receptacle G will then be thrown open, and the surface earth will be shoveled up into this receptacle. When this is full the cover will be hooked down, and the cylinder be turned over until the covers of receptacle E are at the position seen in Figs. 2 and 3. These covers will be thrown open and the balance of earth in the grave will be shoveled up into this compartment, and the covers be again hooked down. When the grave is to be filled, the cylinder will be slipped forward until it is over the grave, the rods will be unhooked, and the cylinder, by the crank R, will be turned over so that the covers are down, when the catches H will strike against the stops *r* or *s* and be unhooked, and the cover or covers will drop open and let the earth fall into the grave—that from receptacle E first, and then, by turning over, that from receptacle G. Instead of the stops *r* and *s*, some other readily-suggested mode of releasing the covers may be used.

The details of the mechanism may be changed in some things, and the main features of the invention be preserved, which are the revolving and sliding cylinder, the adjustable bars, and the adjustable posts.

Therefore, we claim—

1. The grave-filling machine, having the revolving cylinder A, with the hinged covers $f$, and the axle B hung in the sliding boxes $d$, working on the adjustable bars L, in combination with the frame C, substantially as and for the purposes specified.

2. The adjustable bars L, operated by the screws $m$, in combination with the frame C and cylinder A, substantially as and for the purpose set forth.

3. The adjustable posts P in combination with the frame C, substantially as set forth, and for the purpose specified.

EDWIN R. PARSIL.
CHARLES H. VAN HOUTEN.

Witnesses:
HORACE HARRIS,
CHAS. P. ROST.